United States Patent [19]

Bongers et al.

[11] Patent Number: 4,814,356

[45] Date of Patent: Mar. 21, 1989

[54] HIGH MOLECULAR WEIGHT POLYTETRAMETHYLENEADIPAMIDE PELLETS

[76] Inventors: Antonius J. P. Bongers, Julianalaan 37, 6124 AG Born; Eize Roerdink, Laathofstraat 15, 6191 GD Beek (L.), both of Netherlands

[21] Appl. No.: 177,686

[22] Filed: Apr. 5, 1988

Related U.S. Application Data

[63] Continuation-in-part of Ser. No. 935,221, Nov. 26, 1986.

[30] Foreign Application Priority Data

Jul. 22, 1986 [NL] Netherlands .......................... 8601893

[51] Int. Cl.$^4$ ................................................. C08J 9/24
[52] U.S. Cl. ........................................ 521/56; 521/60; 521/184; 521/189; 521/918; 525/420; 528/335; 528/502

[58] Field of Search ................ 521/56, 60, 184, 189, 521/918; 528/335, 502

[56] References Cited

U.S. PATENT DOCUMENTS

| | | | |
|---|---|---|---|
| 4,408,036 | 10/1983 | Gaymans et al. | 528/335 |
| 4,446,304 | 5/1984 | Gaymans et al. | 528/335 |
| 4,460,762 | 7/1984 | Gaymans et al. | 528/335 |
| 4,757,131 | 7/1986 | Bongers | 528/335 |

*Primary Examiner*—Morton Foelak
*Attorney, Agent, or Firm*—Cushman, Darby & Cushman

[57] ABSTRACT

The invention relates to polyamide pellets for use in the production of high molecular weight polytetramethyleneadipamide articles. The polyamide pellets have sizes of between 1 mm and 20 mm and porosity of between 0.1 and 20 vol %. Prepolymer polyamide pellets have a crushing strength of at least 0.5, and after-condensed pellets have crushing strength of at least 15 kg.

16 Claims, No Drawings

HIGH MOLECULAR WEIGHT POLYTETRAMETHYLENEADIPAMIDE PELLETS

RELATED APPLICATIONS

This a continuation-in-part application of Ser. No. 935,221, filed Nov. 26, 1986, the disclosure of which is incorporated by reference herein.

FIELD OF THE INVENTION

The invention relates to polyamide pellets for use in the production of high-molecular weight polytetramethyleneadipamide articles.

BACKGROUND OF THE INVENTION

The preparation of high molecular weight polytetramethyleneadipamide is known from e.g. EP-B-No. 0039524, corresponding to U.S. Pat. No. 4,408,036, and 0038094, corresponding to U.S. Pat. No. 4,460,762, in which the process is carried out in two steps, viz. a precondensation reaction between 1,4-diaminobutane and adipic acid, resulting in a prepolymer with a number-average molecular weight of less than approx. 10,000, which is subsequently after-condensed in the solid phase. Before the prepolymer is subjected to the after-condensation reaction, it is ground to particles with an average diameter ranging from 0.1 to 0.5 mm. The after-condensation is carried out in a tumbling dryer or other type of reactor in which the particles are continuously in motion.

In practice, an economical large-scale application of such a method of after-condensation and conversion of the method into a continuous process is difficult to realize. When using a tumbling dryer, fouling of the wall, which may lead to lump formation and a colored product, occurs frequently as a result of the sintering and caking of the after-condensing particles. Furthermore, the high molecular weight product resulting from the after-condensation must be melted and extruded into pellets, in which form it is suitable for commercial sale Processes carried out in the melt offer certain advantages in this respect. They are described in EP-A-No. 0160337. A disadvantage is that, because the melting point of polytetramethyleneadipamide is very close to its decomposition temperature, the temperatures have to be controlled very accurately, and the residence times must be restricted. The result of the latter is that it becomes very difficult to obtain a high molecular weight product in a single process. This subsequent after-condensation in the solid phase must be carried out. This after-condensation is preferably carried out with a polymer consisting of particles of a defined size, obtained, e.g., by melt extrusion, in order to avoid case the previously mentioned disadvantages of the after-condensation of small particles. This is a rather time-consuming procedure, however, and the first part of the after-condensation process in the melt is sensitive to interference.

An object of the present invention is therefore to provide polyamide pellets for use in the production of high molecular weight polytetramethyleneadipamide articles which avoid these disadvantages and facilitate carrying out a continuous process on a technical scale. "High molecular weight polytetramethyleneadipamide" refers to a polyamide that can readily be used for further processing, for instance by spinning, extrusion and molding into end products. In general its $\eta_{rel}$ should be at least 2.0.

A further object of the invention is to provide the prepolymer obtained from the first condensation reaction in a form which is suitable for after-condensation in the solid phase in a single continuous process, requiring no additional processing steps, such as melt extrusion, to render the high molecular weight product suitable for further processing.

A still further object of the invention is to provide after-condensed high molecular weight polyamide in a form suitable for further processing.

SUMMARY OF THE INVENTION

The polyamide pellets according to the present invention consist substantially of tetramethyleneadipamide units of the formula, —NH—(CH$_2$)$_4$—NH—CO—(CH$_2$)$_4$—CO—. These polymer pellets may be used in the production of high molecular weight polyamide articles. The invention provides both prepolymer polyamide pellets and after-condensed polyamide pellets.

The prepolymer polyamide pellets have a size of between 1 mm and 20 mm, a porosity of between 20 and 0.1 vol % and crushing strength of at least about 0.5 kg. The prepolymer polyamide pellets are prepared by first producing polyamide prepolymer particles with a number-average molecular weight of less than approximately 10,000, by means of a condensation reaction between 1,4-diaminobutane and adipic acid. The resulting prepolymer particle mass is subsequently compressed into pellets. The prepolymer polyamide pellets are subjected to an after-condensation reaction in the solid phase to form the after-condensed polyamide pellets of the invention.

The after-condensed polyamide pellets have a porosity similar to the prepolymer pellets but exhibit crushing strength of at least about 15 kg.

DETAILED DESCRIPTION OF THE PREFERRED EMBODIMENT

The polyamide used in the present invention consists mainly of tetramethyleneadipamide units, e.g. at least 75 mole % of the units; in special cases this concentration may be less, providing the melting point is not lowered to such an extent that the duration of the after-condensation reaction in the solid phase becomes unacceptably long. All known amide-forming substances may be used as polymerization components, e.g. amino acids, lactams, diamines and dicarboxylic acids, but other co-polymer components such as esters and imide-forming substances may also be used.

The number of tetramethyleneadipamide units is preferably at least over 85%, a concentration of at least 90% offers greater advantages.

For the precondensation reaction, the individual monomers or salts thereof may be used. It is advantageous to use an excess of amine. The polymerization may take place in either the solid or the liquid phase as described in, e.g., EP-B-No. 0039524 corresponding to U.S. Pat. No. 4,408,036, the disclosures of which are incorporated by reference. The precondensation reaction is continued until a product is obtained with a number-average molecular weight of less than approximately 10,000, preferably between 500 and 5000.

For a continuous process, it is advantageous to obtain the reactor contents in liquid form while simultaneously releasing the pressure.

The resulting prepolymer is subsequently given the required particle size, by e.g. grinding. The size of the particles may in principle vary over a wide range, e.g. from 1 μm to 20 mm, more particularly from 10μ to 1 mm and preferably from 30 to 650 μm. The particle size depends on the required molecular weight distribution in the end product and the capability of the equipment used for the compression. The indicated size range covers at least 95 wt. % of the prepolymer particle mass.

Spray-drying the reactor contents offers particular advantages enabling a regular particle mass to be obtained in a reproducible manner without intermediate processing. In spray-drying, the autogenous pressure built up in the prepolymerization reactor is utilized with advantage.

The particle mass obtained in the manner described above is subsequently compressed into molded shapes, hereinafter to be termed pellets, according to known procedures. Applicable procedures are e.g. described in Perry's Chemical Engineer's Handbook, 4th Edition, McGraw, H. II, New York, 8-62/64 (1963) and include tableting with a rotary press. Compressing is preferably carried out at temperatures below the melting point of the polyamide, e.g. at temperatures below 200° C., preferably below 100° C. In principle, any shape may be chosen for the pellets, but cylindrical or spherical pellets are preferable. The size of the pellets may vary over a wide range and is determined mainly by the requirements of the shape of and the conditions in the after-condensation reactor and by the requirements of the equipment used to process the obtained high molecular weight product. The dimensions may vary from 1 to 20 mm. Cylindrical after-condensed pellets, which are fed via standard hoppers into processing equipment such as extruders, preferably have a diameter ranging from 1.5 to 5 mm and a length from 3 to 10 mm.

The prepolymer polyamide pellets have a porosity of between 20 and 0.1 vol.%. The porosity is influenced by the particle size, particle size distribution and the water content of the prepolymer particle mass, and the conditions of the compressing process such as pressure and temperature. The porosity should not be too high; otherwise the mechanical strength of the pellets is too low for further processing. Advantageously, the porosity is between 15 and 0.5 vol.%. The porosity of the pellets results in a faster and more uniform after-condensation process of the prepolymer compared to massive granules obtained by the melt extrusion process of EP-A-No. 0160337. Best results are obtained with a porosity of between 10 and 1 vol.%.

The prepolymer polyamide pellets have a crushing strength of at least 0.5 kg, preferably at least 1.5 kg.

It is surprising that without the addition of any binding agent, pellets may be obtained which can easily be handled without disintegrating, and which retain their shape during the after-condensation step. These pellets are subsequently, without further processing, fed into a second reactor, in which, e.g., under the reaction conditions known from EP-B-No. 0038094, the after-condensation into high molecular weight polymer takes place in a water vapor-containing inert gaseous atmosphere.

According to the invention, the water content of the prepolymer particle mass may vary over a wide range without causing problems such as lump formation during the after-condensation reaction, e.g. from 1 to 30 wt. %, based on the total weight. Therefore, it is unnecessary to supply additional heat to the spraying areas or to take special precautions for possible intermediate storage of the powdered prepolymer mass. Depending on the type of equipment used for making the pellets, a water content from 2 to 15% in the prepolymer particle mass offers certain advantages. If so desired, the water content of the pellets can be controlled by adding additional water to the prepolymer mass.

This after-condensation may be carried out in any known reactors suitable for this purpose, such as tumbling dryers, fluidized bed reactors etc.

It is preferable to use a so-called moving packed bed reactor with continuous feed of the prepolymer pellets at the top and discharge of end products at the bottom for a continuous process. Perry's Chemical Engineer's Handbook, supra, defines such a reactor as a 'gravity vessel' (see P. 20-25). Within the packed bed, the pellets are moving under the influence of gravity and are not mixed any further.

During this after-condensation process, the mechanical strength of the pellets further increases, so that the after-condensed polyamide pellets can be bagged or poured into containers without further processing and without an unacceptable amount of fines being produced. The crushing strength of the after-condensed polyamide pellets is at least 15 kg. During the after-condensation process, the porosity of the pellets remains about the same, that is between 20 and 0.1 vol. %.

The high molecular weight polytetramethyleneadipamide prepared using the polymer pellets according to invention leads to better spinning results than polytetramethyleneadipamide obtained according to the method described in Example 1 of EP-B-No. 0038094 which is subsequently melted and formed into granulate. Accordingly, the products of the present invention possess a more uniform molecular distribution.

High molecular weight polytetramethyleneadipamide porous compacted pellets also have the advantage that they can be dried in a considerably shorter time than the massive granules that are already known in the art. Especially for spinning applications, it is very important that the polyamide is thoroughly dried.

A further advantages of the high molecular weight porous compressed pellets according to the invention is that the pellets can be easily disintegrated into small particles so that less energy and lower local temperatures are required for melt mixing in for instance extruders. The result is that less decomposition takes place compared to massive chips or pellets, where higher compression is required.

Further advantage is achieved in the preparation of so-called master fluffs (powder mixtures), where the processes of grinding and mixing can easily be combined under mild conditions when the high molecular weight polyamide pellets of the invention are used.

Due to their porosity, the pellets according to the invention can be easily impregnated with solutions or suspensions of additives such as stabilizers, colorants, pigments and flame retardants. By this method, higher concentrations can often be realized than through melt mixing in the preparation of master batches. Very uniform distribution is also possible. The additional, but conventional thermal step can also be omitted, thus avoiding the possibility of undesired lowering of the molecular weight of the polyamide. Further, corrosion of extruders due to the high concentration of aggressive chemicals can be avoided in the preparation of master batches through melt mixing.

As the shape and density of the porous compacted pellets are very similar to those of conventional massive pellets, the flow behavior in hoppers is identical, and existing apparatus can be used for processing the pellets.

In general, porous compacted pellets of high molecular weight polytetramethyleneadipamide according to the invention enable processing under milder conditions than massive chips and pellets according to the state of the art.

The invention will now be further elucidated through the following examples and comparative examples, without, however being restricted thereto.

EXAMPLE I

The prepolymer particle mass was obtained by adding approx. 1 kg of diaminobutane and 12 kg of water to 147 kg of nylon 4.6 salt and letting this react for approx. 25 minutes at 207° C. in a closed reactor, during which time the pressure increased to 12.5 bar (1.25 MPa). The contents of the reactor was subsequently discharged via a spray nozzle into an area with nitrogen at atmospheric pressure. As a result of the heat present in the droplets, the water present in the reactor mass was almost completely evaporated and the sprayed droplets cooled. The resulting prepolymer particles mass had particle sizes ranging from 30 to 650 μm. The number-average molecular weight was approx. 1000, the water content being 9%.

2 kg of the prepolymer particle mass obtained according to the method described above was fed to a laboratory press with a horizontal flat die and a head equipped with two vertical mill-stones. The die is provided with holes with a diameter of 3 mm and a length of 9 mm. Beneath the die are knives for adjusting the required length of the pellets. Coherent pellets were obtained at 60° C. and at an output of 39.2 kg/h. After-condensation in a tumbling dryer for 5 hours at 255° C. in a nitrogen atmosphere containing 25% water vapor (mass basis) resulted in a white after-condensate with $\eta_{rel}$=3.7 (measured on a solution of 1 gram in 100 ml 96 weight % sulfuric acid). The concentration of fines <1 mm was 0.6 wt. %.

EXAMPLE II 2 kg of the prepolymer particle mass from Example I was mixed with water in a mixer to a total water content of 26 wt. %. This particle mass was processed into pellets using a pressing machine, Granuliermaschine G 1/100/160 S manufactured by Alexander Aktiengesellschaft at Remscheid, West Germany. The pressing machine concerned consists of two cylinders, one of which, the granulating cylinder, is power-driven and is provided with equally distributed identical pierced holes. No power is applied to the smooth pressure cylinder, which presses the particle mass poured into the top part of the gap between the rolls through the pierced holes of the granulating cylinder, on the inside of which are knives for shearing the pellets. Regularly shaped pellets with a diameter of 2 mm and length varying from 1 to 4 mm were obtained at a temperature of 30° C. The crushing strength of the pellets was between 0.5 and 1.0 kg.

EXAMPLE III

A prepolymer powdered mass was produced according to the method describe in Example I. Since 5 instead of 12 kg of water were added to the reactor, the water content of the prepolymer powdered mass was only 3.3%. The number-average molecular weight of the prepolymer was approx. 1200.

The entire mass of powdered prepolymer thus obtained was processed into pellets in a pressing machine of type GCLS 200/40 manufactured by Bepex at Leingarten, West Germany. This pressing machine operates on the principle of two interlocking tooth wheels provided with pierced holes through which the particle mass is pressed. With holes with a diameter of 2 mm and a length of 4 mm, hard white pellets with a length varying from 5 to 20 mm were obtained at approximately 70° C. The crushing strength of the pellets was 3 kg, the porosity was 5%.

An externally insulated steel column with a diameter of 15 cm and a height of 150 cm was filled with 14 kg of pellets. The column and its contents were heated with a N$_2$ gas flow containing 25 wt. % water vapour to a temperature of 255° C., which temperature was subsequently maintained On reaching this temperature, approx. 2.5 kg of pellets were discharged per hour from the bottom of the column and the same amount of prepolymer pellets were added at the top of the column. The relative viscosity of this discharged polymer, which was white, was determined. These values are given in the following table.

| duration | 5 | 6 | 7 | 8 | 9 | 19 |
|---|---|---|---|---|---|---|
| $\eta_{rel}$ | 3.9 | 3.7 | 3.7 | 3.6 | 3.6 | 3.7 |

The duration was measured by the amount of time elapsed after the column had reached 255° C. $\eta_{rel}$ was determined in a solution containing 1 gram in 100 ml of 96 wt. % sulphuric acid at 25° C.

The product discharged from the column contained 0.40 wt. % fines smaller than 1 mm. The crushing strength of the pellets was >15 kg. The porosity was 4.9%.

EXAMPLE IV

Example III is repeated, however, with the difference that 5 wt. % ε-caprolactam, based on the nylon 4.6 salt, was added to the prepolymerisation reaction.

The resulting prepolymer particle mass had a number-average molecular weight of approx. 1200.

This time, however, the temperature of the column for the continuous after-condensation was increased to 240° C. and the residence time of the mass in the column was prolonged to 16 hours. The result was a high-molecular white product. Once the column had become stationary, $\eta_{rel}$ was 3.7. The amount of fines discharged along with the end product was 0.42 wt. %.

EXAMPLE V

Example I was repeated. Part of the reactor contents was obtained after spray-drying as compacted powder pellets.

The crushing strength of these pellets is about 1.5 kg.

The remainder of the reactor contents was obtained as a solid mass by cooling the reactor and releasing the pressure. This solid mass was chopped, and particles of about the same dimensions as the compacted powder pellets were selected. The molecular weight of the polyamide in the compacted powder pellets and the massive particles is 1000 and 1200 respectively. After-condensation was performed at 250° C. and under a nitrogen atmosphere containing 0.3 g of water vapor per liter of nitrogen at atmospheric pressure. The after-condensation process was followed as a function of the time by taking samples and determining the relative viscosity.

|  | 1 hr | 3 hr | 6 hr | 16 hr |
|---|---|---|---|---|
| compacted pellets | 2.48 | 3.05 | 3.44 | 4.20 |
| massive particles (comp. ex.) | 2.20 | 2.80 | 3.10 | 3.80 |

The crushing strength of the aftercondensed compacted powder pellets (6 hr) was >15 kg.

The porosity of the after-condensed compacted pellets (6 hr) was 6.9 vol.%.

Samples of the compacted pellets and massive particles, that had been after-condensed for 16 hours, were conditioned at 60° C. for 6 hours in an atmosphere of 50% relative humidity. Subsequently, the pellets were dried at 105° C. in a dry nitrogen atmosphere. The water content was determined after 1.5 hours.

Porous compacted pellets—0.05 wt. % $H_2O$
massive pellets (comp. ex.)—0.11 wt. % $H_2O$ Drying of the porous compacted powder pellets proceeds appreciably faster than the massive particles.

The following method have been used for the determination of the properties:

Relative viscosity: $\eta_{rel}$ on a solution of 1 gram in 100 ml 96 wt. % $H_2SO_4$ at 25° C., Porosity: mercury penetration method with the pressure increasing to 120 bar.

Crushing strength: the force needed to crush the pellet by a cylinder with 3 mm diameter, determined with a ERWEKA type TBT crushing strength measuring instrument as the mean value of 10 measurements.

What is claimed is:

1. Compressed porous prepolymer polyamide pellets for use in the production of high molecular weight polyamide articles, said polyamide pellets consisting essentially of units having the formula, $$-NH-(CH_2)_4-NH-CO-(CH_2)_4-CO-,$$

said polyamide pellets having a size of between about 1 mm and about 20 mm, a porosity of between 0.1 and 20 vol. % and crushing strength of at least about 0.5 kg.

2. Compressed porous prepolymer polyamide pellets according to claim 1, wherein said polyamide pellets are produced by compressing prepolymer particles having a number-average molecular weight of less than about 10,000 into pellets.

3. Compressed porous prepolymer polyamide pellets according to claim 1 having a substantially cylindrical shape with a diameter of between about 1.5 mm to about 5 mm and a length of between about 3 mm and about 10 mm.

4. Compressed porous prepolymer polyamide pellets according to claim 1 having porosity between 15 and 0.5 vol. %

5. Compressed porous prepolymer polyamide pellets according to claim 1 having porosity between 10 and 1 vol. %.

6. Compressed porous prepolymer polyamide pellets according to claim 2 having a substantially cylindrical shape with a diameter of between about 1.5 mm to about 5 mm and a length of between about 3 mm and about 10 mm.

7. Compressed porous prepolymer polyamide pellets according to claim 2 having porosity between 15 and 0.5 vol. %

8. Compressed porous prepolymer polyamide pellets according to claim 2 having porosity between 10 and 1 vol. %.

9. After-condensed high molecular weight polyamide compressed pellets for use in the production of spinned, molded or extruded articles, said polyamide pellets consisting essentially of repeating units having the formula, $$-NH-(CH_2)_4-NH-CO-(CH_2)_4-CO-,$$

said polyamide pellets having a size of between 1 mm and 20 mm, a porosity of between 0.1 and 20 vol. % and crushing strength of at least about 15 kg.

10. After-condensed high molecular weight polyamide pellets according to claim 9, wherein said polyamide pellets are produced by compressing prepolymer particles having a number-average molecular weight of less than about 10,000 into pellets and then after-condensing said prepolymer pellets.

11. After-condensed high molecular weight polyamide pellets according to claim 9 having an approximately cylindrical shape with a diameter of between 1.5 mm and 5 mm and a length of between 3 mm and 10 mm.

12. After-condensed high molecular weight polyamide pellets according to claim 9 having porosity between 15 and 0.5 vol. %

13. After-condensed high molecular weight polyamide pellets according to claim 9 having porosity between 10 and 1 vol. %.

14. After-condensed high molecular weight polyamide pellets according to claim 10 having an approximately cylindrical shape with a diameter of between 1.5 mm and 5 mm and a length of between 3 mm and 10 mm.

15. After-condensed high molecular weight polyamide pellets according to claim 10 having porosity between 15 and 0.5 vol. %

16. After-condensed high molecular weight polyamide pellets according to claim 10 having porosity between 10 and 1 vol. %.

* * * * *